June 8, 1943.  G. K. PORTER  2,321,041
ROTAMETER CONSTRUCTION
Filed Dec. 2, 1940
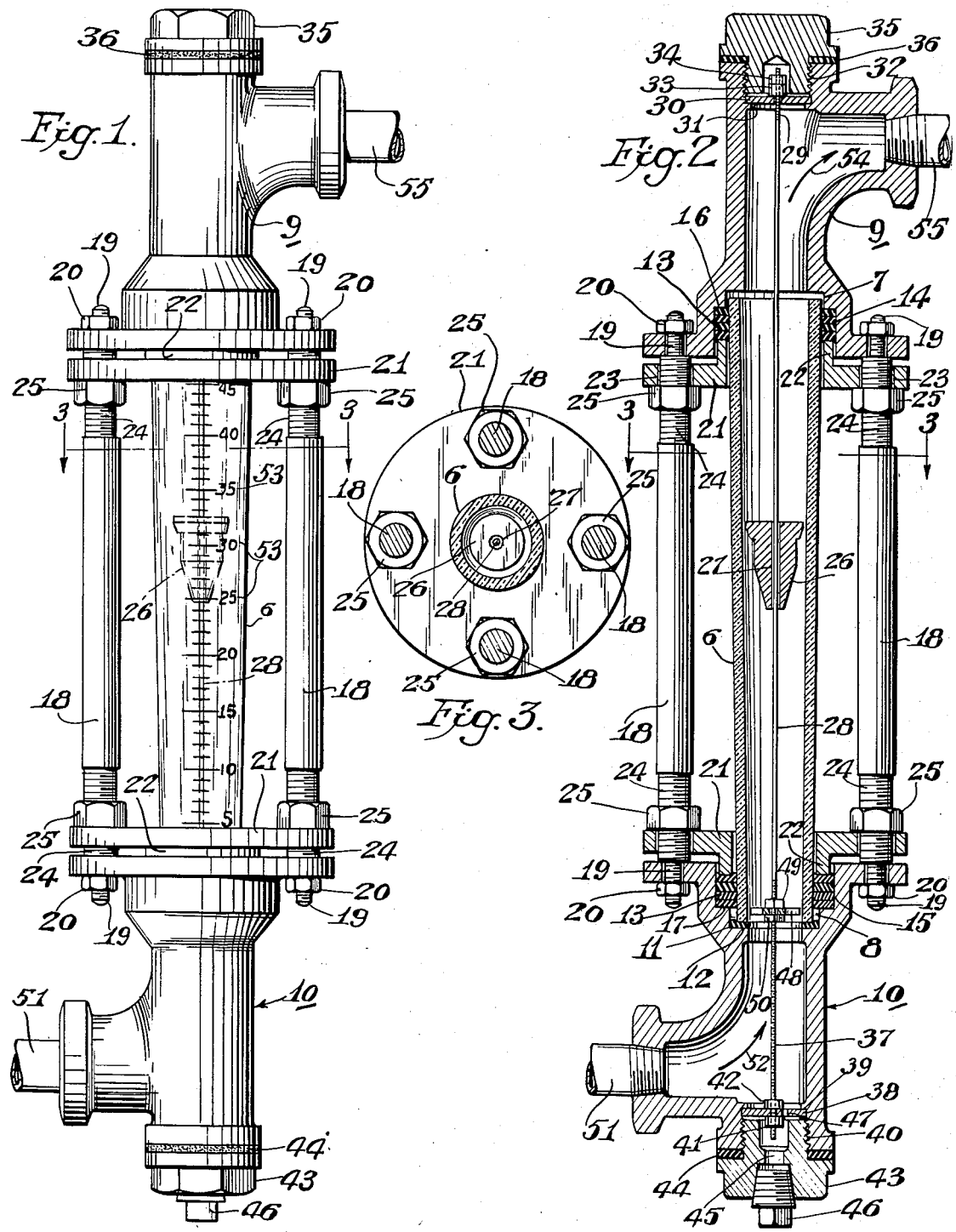
INVENTOR.
George K. Porter
BY Leonard L. Kalish
ATTORNEY.

Patented June 8, 1943

2,321,041

UNITED STATES PATENT OFFICE 2,321,041

ROTAMETER CONSTRUCTION

George K. Porter, Philadelphia, Pa., assignor, by mesne assignments, to Fischer & Porter Company, Hatboro, Pa., a corporation of Pennsylvania Application December 2, 1940, Serial No. 368,236

3 Claims. (Cl. 73—209)

The present invention relates to variable-area rate-of-flow meters of the tapered-tube and float type commonly called rotameters.

These rotameters are used for accurately measuring the rates of flow of various fluids, and commonly comprise an upright transparent tapered tube with its narrow portion lowermost and having a float member therein adapted to be lifted and suspended by a vertically-upward flow of fluid through said tube. As the float member rises, the cross-sectional area of the annular fluid-conducting passageway or gap between float member and the inside tapered wall of the tube increases, until the float member comes to rest at some vertical position determined by the rate of flow of said fluid. This vertical position or height of the float-member, can then be readily observed from juxtaposed or adjacent scale markings, either directly on the fixed transparent tube or elsewhere, and accurately indicates the concurrent rate of flow of said fluid.

In many instances, the float member is caused continuously to rotate or spin about its vertical axis by the upward passage of fluid therepast, as for example by providing fluid-responsive inclined or curved vane-like surfaces on said float member, which surfaces, when encountered by the moving fluid, impart rotation to the float member. In other instances, however, the float member may be devoid of any separate rotation-imparting means, and is not designed to rotate when floating in the stream of fluid.

In either case, however, physical contact between the float member and the wall of the tapered tube may, and indeed frequently does, occur. This physical contact may result in the breakage of the relatively expensive tapered transparent tube, commonly made of glass;—this tube-breakage being especially apt to occur when a vapor bubble passes through with liquid flow, or when a liquid bubble passes through with vapor flow, or when a violent surge in the line takes place due to sudden rise or fall of pressure, starting up of a pump or the like, thus causing the float to be thrust violently against the tube wall.

Furthermore, physical contact between float member and tube wall, even when of a less violent character than above indicated, wears the accurately-surfaced wall of the tube as well as the float member itself, thereby impairing the accuracy of the rotameter.

It has been proposed in the past to prevent this physical contact between float member and tube wall by guiding the float member inside the tube by means of an inherently rigid metal guide-rod passing through the float and along which rod the float was designed to slide. However, such guide-rod of necessity had to be of sufficient thickness or transverse dimension to cause it to maintain its rigidity and provide proper support for the float member. In those instances where the fluid passing through the rotameter was of a corrosive nature, this relatively large-diametered inherently rigid guide-rod had to be constructed from some non-corrosive expensive metal, such as platinum, tantalum, silver or the like, thus greatly increasing the cost of the rotameter, particularly in view of the relatively large amount of costly metal required.

Furthermore, the outer surface of the rigid large-diametered guide-rod had to be accurately ground to render it sufficiently smooth for the desired purpose, thus adding substantially to the cost of production of the rotameter.

It is an object of the present invention to provide a rotameter having a metallic float-guiding member inside the tube which is relatively inexpensive to produce even when made of precious metal, and which need not be surface-ground for smoothness after its original formation.

With the above and other objects in view, which will appear more fully from the following detailed description accompanying drawing and appended claims, the present invention is one of its aspects, may comprise a rate-of-flow meter of the variable-area type including an upright transparent tapered tube having its narrower end lowermost, upper and lower fittings at the upper and lower ends of said tube, a float member inside said tube having an aperture therethrough, and a relatively fine taut wire of corrosion-resistant metal extending axially through said tube concentrically therewith and through the aperture of said float member, said float member being guided in its vertical movement inside the tube by said taut wire and prevented thereby from physically contacting the wall of said tube.

The present invention in another of its aspects may comprise a rate-of-flow meter of the aforesaid variable-area type having float-guiding means extending axially upwardly through the metering tube and then relatively diverging from the path of departing fluid-flow, whereby a float member slidably mounted on said float-guiding means will be prevented from being carried away in the line by the moving fluid.

For the purpose of illustrating the invention, there is shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of instrumentalities as herein shown and described.

Referring now to the drawing, wherein like reference characters indicate like parts, Figure 1 represents a front elevational view of a rotameter constituting one illustrative embodiment of the present invention.

Figure 2 represents a longitudinal sectional view taken through the rotameter illustrated in Figure 1.

Figure 3 represents a sectional view taken on line 3—3 of Figures 1 or 2, looking in the direction of the arrows, but showing a modified arrangement wherein four posts extend intermediate the upper and lower fittings instead of two posts as illustrated in Figures 1 and 2.

The particular rotameter selected for illustration in the accompanying drawing includes an upright transparent tapered metering tube 6, which may be made of glass or of any suitable transparent plastic material, having its narrower end lowermost. The degree of taper of this metering tube 6 has been expressly exaggerated in the accompanying drawing for the sake of clarity. The upper and lower ends of this metering tube 6 may respectively extend into juxtaposed socket-like openings 7 and 8 respectively formed in the upper fitting 9 and in the lower fitting 10. If desired, the lowermost end of the metering tube 6 may rest on an annular sealing member 11 seated on an inwardly extending annular shoulder 12 formed in the lower fitting 10.

Any suitable sealing means are preferably provided for sealing the joints between the end portions of the metering tube 6 and the upper and lower fittings 9 and 10. Thus, for example, these sealing means may comprise any suitable number, as for instance four, adjacent axially-compressible sealing members 13 which respectively encircle the opposite end portions of the metering tube 6. These sealing members or rings 13 may be formed of any suitable material, the choice of which may be dictated by the character of the fluid which is to pass through the rotameter. Thus, for example, these sealing means may be made of resilient synthetic rubber-like material, as for example of "Neoprene," "Thiokol," "Duprene," "Koroseal," "Resistoflex" or the like. Natural rubber may also be used, as may any other suitable material which may be compressed to seal around the joints at the ends of the metering tube.

These two groups of sealing members 13 may be respectively disposed within end-openings 14 and 15 in the fittings 9 and 10, said latter openings being of somewhat larger diameter than the adjacent recessed portions 7 and 8. Inwardly extending annular shoulders 16 and 17 disposed intermediate the differently diametered portions 7 and 14 on the one hand and 8 and 15 on the other hand may serve as abutment surfaces against which the sealing members 13 may be pressed.

The upper and lower fittings 9 and 10 may be operatively securely held a fixed distance apart by any suitable means, as for example by means of a plurality of upright posts 18, whose opposite threaded end portions 19 may be of reduced diameter and may extend through corresponding openings in the outwardly flanged end portions of said fittings. Nuts 20 may be screw-threadedly mounted on the projecting end-portions of the reduced post-ends 19, and when tightly screwed down they firmly hold the outwardly-extending flanged portions of the fittings against the annular shoulders disposed at the basal portions of these post ends 19.

Any suitable adjustable means may be provided for operatively compressing the annular sealing members 13 to establish and maintain fluid-tight seals at the ends of the metering tube. In the particular embodiment illustrated in the accompanying drawing, such means comprise thrust collars 21 which loosely encircle the respective end portions of the metering tube 6. Each of these thrust collars 21 includes a tubular gland portion 22 proportioned to enter into the fitting stuffing-box portions or recesses 14 or 15 there to engage and axially compress the packing rings 13, and thus crowd them into intimate sealing contact against the adjacent outer wall surface of the metering tube. If desired, the thrust collars 21 may have holes 23 therein through which the posts 18 may extend, and the adjoining portions of these posts may be threaded as at 24 and may carry threaded nuts 25, so that when the nuts 25 are rotated in the proper direction, they will force the thrust collar 21 towards the adjacent end fitting thereby operatively to compress the sealing members 13.

A float member 26, which has a narrow hole 27 extending axially therethrough, is disposed inside the metering tube 6. This float member may be of any desired shape, as for example top-shaped as illustrated, or it may be spherically or otherwise shaped as is well known in the art. If rotation of this float member is desired, two or more slant-wise slots may be formed in the upper rim of the float member as is well known in the art, whereby some of the fluid flowing past said float member will pass through said slots to rotate the float member.

A relatively fine taut float-guiding wire 28 of circular cross-section is preferably accurately centered within the metering tube 6 and extends through the narrow hole 27 in the float member 26. The diameter of this guide-wire 28 is preferably slightly less than the diameter of the hole 27, thereby to permit free sliding movement of the float member on said wire.

The upper end portion of the thin guide-wire 28 may be threaded as at 29, and may extend through a central opening in an upper anchorage disc 30, whose rim rests on an inwardly-extending annular shoulder 31 formed at the base of the internally-threaded opening 32 at the top of the upper fitting 9. An adjustable tensioning-nut 33, which bears against the upper surface of the anchorage-disc 30, screw-threadedly engages the threaded upper end portion 29 of the guide wire. If desired, an additional lock-nut 34 may be provided adjacent the tensioning-nut 33, for locking the latter in its adjusted position. The fitting opening 32 may be closed by a screw-threaded closure-plug 35, and a sealing washer 36 may be interposed between the plug 35 and the upper fitting 9 to seal the joint therebetween.

The lower end portion of the thin guide-wire 28 is also preferably threaded, as at 37, and extends through a central opening in a lower anchorage-disc 38, whose rim bears upwardly against an inwardly-extending annular shoulder 39 formed at the innermost end of an internally-threaded opening 40 at the bottom of the lower fitting 10. The lower end of the guide-wire 28 may be adjustably fixed relative to the anchorage-disc 38 by means of a pair of nuts 41 and 42 mounted on the screw-threaded wire portion 37 on opposite sides of the anchorage-disc 38. An externally-threaded tubular clean-out plug 43 may be operatively screwed into the internally-threaded opening 40, and a sealing washer 44 may be interposed between the plug 43 and the lower fitting 10 to seal the joint therebetween. A passageway 45 in the clean-out plug 43 may terminate at its lower end in an internally-threaded opening normally tightly closed by a removable drain-plug 46. The lower anchorage disc 38 may have one or more openings 47 therein, designed to permit the passage of liquid therethrough when it is desired to drain the rotameter.

By means of the foregoing arrangement, the wire 28, which itself does not possess sufficient inherent rigidity to remain stiff and straight inside the tube, may readily be placed under sufficient tension to insure straightness and immobility inside the tube by merely tightening the adjustment nut 33. The degree of tension applied to the guide wire 28 may vary with requirements, and preferably is at least sufficient to maintain the wire under slight tension at all times during actual operation, so that upon expansion due to increase of temperature, the wire will remain taut and will continue to guide the float and hold it out of contact with the tube wall.

If desired, the multi-armed hub of a wire-centering spider member 48 may be mounted on the threaded portion 37 of the guide-wire 28 inside the lower end of the metering tube 6. The spider member 28 may include a central apertured hub portion and a plurality of spaced radially-extending arms or spokes which terminate adjacent the inner wall of the tube 6 and thus serve to center the wire 28; sufficient clearance being provided between the spokes to permit the passage of fluid across the spider without causing flow-constriction. The exact position of this spider member 48 may be adjustably fixed by means of the opposed nuts 49 and 50, which screwtheadedly engage the guide-wire 28 on opposite sides of said spider member. This wire-centering spider 48 positions and holds the guide-wire 28 co-axially inside the metering tube 6, insuring that the float member 26 which is slidably mounted on the guide-wire 28 will at all times be accurately centered inside the tapered metering tube 6. The upper spider nut 49 may also serve as a lower float stop.

In actual operation, the fluid whose rate-of-flow is to be measured may be conducted into a side of the lower inlet fitting 10 through a pipe 51 from whence it may flow upwardly in the direction of the curved arrow 52 past the wire-centering spider 48 and into the metering tube 6. In this tube, the fluid encounters the float member 26, which we will assume was resting on the lower float stop nut 49, and raises the said float member towards the larger end of the tapered tube to make proper passage for the fluid around the rim of the float member. As the float member rises, the cross-sectional area of the gap between the rim of the float member and the inner wall of the metering tube increases. The position at which the float member 26 comes to rest in a vertical sense may be noted by means of the scale-markings 53, which may be fused or etched directly on the metering tube or which may be carried by any plate or other member disposed in proximity to said metering tube. These scale-markings 53 may be calibrated directly to indicate the rate-of-flow in any desired units of volume per unit of time, or else they may merely indicate height in any desired units of length.

The fluid flowing upwardly past the rim of the suspended float member 26 then leaves the metering tube 6 and enters the upper outlet fittings 9, in which it then diverges from the guide-wire 28 in the direction indicated generally by the curved arrow 54 and enters the outlet pipe 55. It will be seen that the float member 26, which cannot leave the taut guide-wire 28, is prevented from being carried away by the diverging flow of fluid.

The float-guiding wire 28 confines the movements of the float member 26 to a path co-axial with the metering tube 6 and prevents the float member from ever coming into contact with the inner tapered wall of the metering tube 6. This avoids tube-breakage, and also avoids frictional wear on the inner surface of the metering tube as well as on the float member, thereby assuring constant accuracy of measurement.

The application of tension to the float-guiding member 28 makes possible the use of relatively small-diameter wire therefor, thus greatly reducing the cost where relatively expensive corrosion-resistant metal is required. Furthermore, the use of drawn wire for float-guiding purposes obviates the need of grinding the outer surface of the float-guiding member to insure smooth sliding of the float-member thereover, as would be the case were an inherently rigid rod of relatively large diameter used to guide the float. Thus wire, in the very process of its formation by drawing or extrusion through dies, automatically acquires an outer surface smooth enough not to require subsequent grinding.

Although in the rotameter illustrated in the accompanying drawing, the inlet and outlet fittings disposed at the opposite ends of the metering tube each change the direction of fluid-flow by 90 degrees, it is to be expressly understood that if desired, one or both of these fittings may be replaced with any other conventional and desired form of fitting. In such cases suitable change or modification of the construction and/or location of the anchorage means at the opposite ends of the float-guiding wire might be required, which changes or modifications would be readily apparent to one skilled in the art.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A fluid flow meter including an upright elongated tapered transparent metering tube having its narrower end lowermost, separate inlet and outlet fittings in sealed communication with the lower and upper ends of said tube respectively, said fittings each having an end opening in alignment with the extended axis of said metering tube, an inwardly-extending annular shoulder at the innermost portion of each of said end openings, openings in said fittings respectively adapted for connection with conduit means leading to and from said flow meter, structural means securely holding said fittings a fixed distance apart, a taut guide-wire inside said transparent metering tube extending coaxially therethrough, transversely-extending anchorage means associated with the opposite end portions of said guide-wire seated on said inwardly-extending annular shoulders, adjustable means at one end portion of said guide-wire for adjustably longitudinally tensioning said wire, and a float member inside said tube freely slidably mounted on said taut guide-wire and restrained thereby from coming into contact with the wall of said tube.

2. A fluid flow meter including an upright elongated tapered transparent metering tube having its narrower end lowermost, separate inlet and outlet fittings having stuffing boxes at the lower and upper ends of said tube respectively with said ends disposed within said stuffing boxes, structural means securely holding said fittings a fixed distance apart, stuffing glands operatively mounted upon said structural means and adapted adjustably to coact with said stuffing boxes to provide a fluid-tight seal between said fittings and said tube, a corrosion-resistant guide-wire of relatively small diameter inside said transparent tube coaxial therewith and having its opposite ends anchored in said fittings, said guide-wire being under tension, and a float member inside said tube having an axial hole therethrough of a diameter only slightly larger than the diameter of said guide-wire, said guide-wire extending through said hole and guiding said float member in its movements inside said tube.

3. In a fluid flow meter having an upright elongated tapered transparent metering tube with its narrower end lowermost, separate inlet and outlet fittings in sealed communication with the lower and upper ends of said tube respectively, and structural means securely holding said fittings a fixed distance apart, a taut guide-wire inside said transparent tube coaxial therewith said guide-wire having its ends anchored in said fittings, a spider carried by said guide-wire adjacent the lower end of said metering tube, and a float member inside said tube mounted on said taut guide-wire and freely slidable therealong, said spider serving to center said guide-wire and to provide a lowermost stop for said float member.

GEORGE K. PORTER.